Patented Jan. 13, 1953

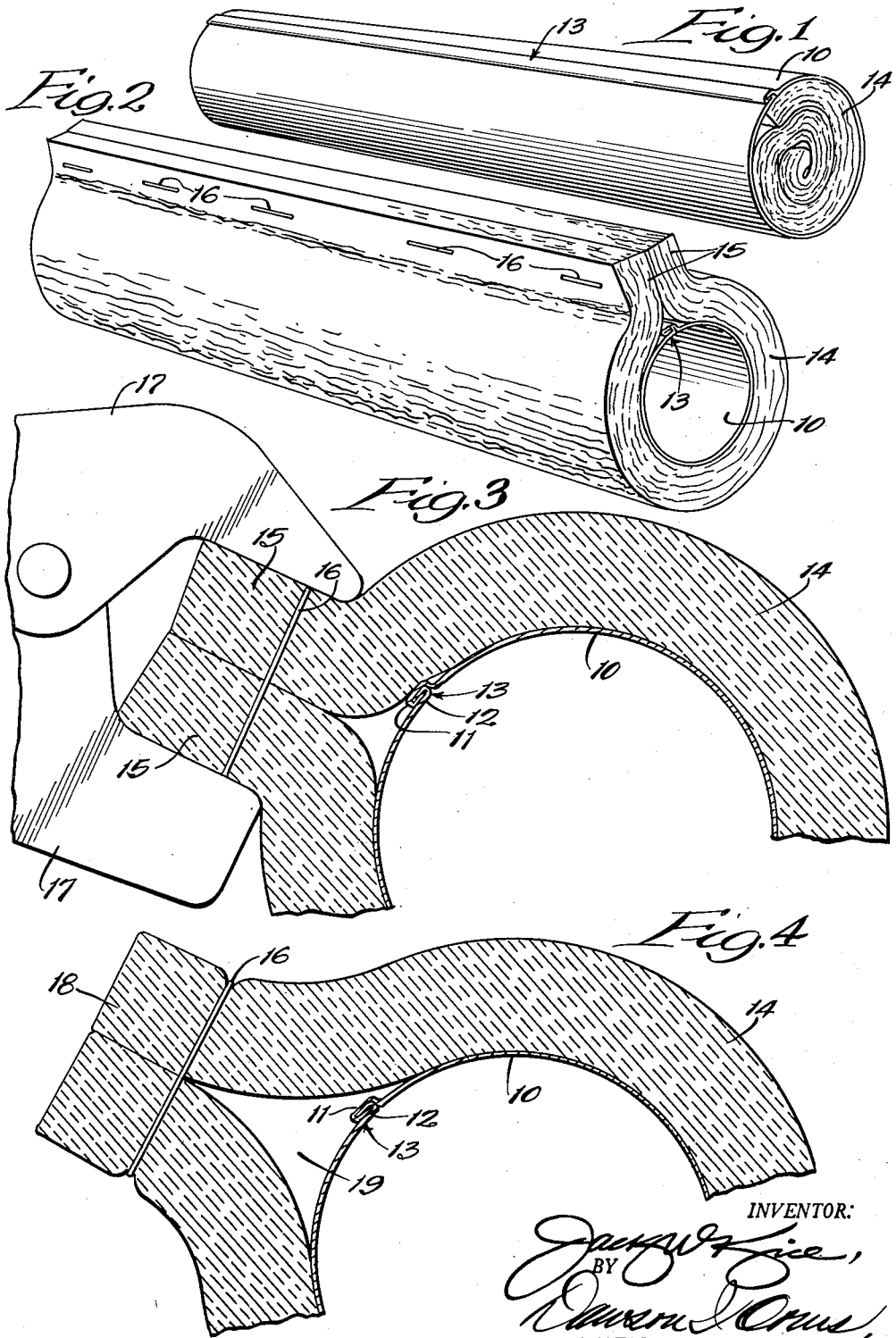

2,625,263

UNITED STATES PATENT OFFICE 2,625,263

PIPE AND INSULATION STRUCTURE

Jack W. Kice, Wichita, Kans., assignor to The Coleman Company, Inc., Wichita, Kans., a corporation of Kansas Application September 9, 1950, Serial No. 184,060

7 Claims. (Cl. 206—47)

This invention relates to a pipe and insulation structure. The invention is particularly useful in connection with thin pipe of a character used in installing air heating and conditioning systems for homes and buildings, etc.

The shipment of pipe and insulation material for the pipe while protecting such materials during shipment and enabling them to be readily brought together during installation has presented a number of serious problems. The thin pipe is fragile and may be readily bent or distorted while the insulation may be deformed due to unusual pressures and blows received during shipment, etc. Similarly, in installing the pipe in insulation it is found that the fibers often cannot be properly brought together but are distorted and present a bulky appearance about the pipe. Further, the method of assembling the insulating or fibrous material about the pipe is laborious and time-consuming, while often the fibers are stretched too much in parts to weaken the insulation and render it less efficient in spots.

An object of the present invention is to overcome the above difficulties and to provide an arrangement whereby both the pipe and insulation are protected during transit, while the insulation particularly is preformed for ready attachment to the pipe after removal. Yet another object is to provide the means and method for packaging pipe and insulation and for readily securing the insulation batt about the pipe so as to form an even and uniform distribution of the insulative body about the pipe. Yet another object is to provide a means and method for packaging and shipping insulation material so as to cause such material to assume the desired position during installation and to cause the fibers of the insulative material to knit readily during the combining of the ends of the material about the pipe. Other specific objects and advantages will appear as the specification proceeds.

The invention is shown in an illustrated embodiment, by the accompanying drawing, in which—

Fig. 1 is a perspective view of a pipe and insulation carried thereby in accordance with my invention; Fig. 2, a perspective view of the pipe enclosed by the insulating batt in accordance with my invention; Fig. 3, a broken enlarged perspective view showing the stapling of the free ends of the insulating batt; and Fig. 4, a view similar to Fig. 3, and showing the structure after the stapling operation.

In the illustration given, 10 designates a pipe which may be formed of steel sheet, aluminum, or any suitable material. In the specific illustration given, the pipe 10 is provided along one edge with a hook 11 and along another edge with a hook 12. The hooked edges are brought together, as illustrated best in Figs. 3 and 4, and the joined edges may be pressed together to form a sturdy joint. If desired, the overlapping edges of the pipe 10 may be secured together by welding, bonding means, or by any desired method. The joint indicated in the drawing as formed by bringing together the hook ends 11 and 12 is indicated by the numeral 13.

I provide an insulation batt 14 formed of glass fibers or any other suitable material. It will be understood that an asbestos blanket or a blanket of any other suitable insulating material may be employed. I prefer to employ a highly resilient insulating material such as, for example, glass fibers, and to roll the batt 14 into a compressed bundle, and to introduce the bundle in tightly compressed condition within the pipe 10, as illustrated in Fig. 1. Within the pipe, the highly resilient compressed batt serves at least two important functions. The fibers press outwardly against the thin pipe walls and support them against denting, etc. during transit. Again, the fibers themselves are preformed or shaped by being carried within the pipe so that, after removal from the pipe and being brought into the position shown in Fig. 2, the batt tends to cling closely about the pipe and to bring the end portions thereof together.

In order to accomplish effectively the above results, I prefer to have the batt substantially equal in length to the length of the pipe. Thus the pipe is supported throughout its length with the resilient roll of compressed fibers while, at the same time, the blanket or batt of fibers, after being held under compression within the rolled form, for a long period of time (as during storage and shipment) tends to assume an annular position, when withdrawn from the pipe, and to cling against the exterior walls of the pipe. At the same time, the free end portions 15 of the batt 14 are brought together into contiguous and generally parallel relation. By virtue of the preforming of the fibers, as described, the ends 15 tend to lie closely together and it is then easy to unite these by staples 16, as illustrated in Figs. 2 and 3. An ordinary stapling device having jaws 17 for feeding staples may be employed for this purpose. Since such a type of stapler is well known, a further detailed description is believed unnecessary.

Upon the removal of the stapler 17, it is found that the staples 16 firmly unite the parallel end portions of the batt 14 and such edge portions, when thus bound by staples, are found to provide a handle 18 which facilitates the rotating of the insulation upon the pipe to any desired point. For example, after the insulation has been attached, it is often desired to rotate the insulation to bring the upper portion thereof against the wall space and this may be readily accomplished by grasping the handle portion 18 and swinging it about the pipe. While the end portions of the pipe provide a small air space 19 therebetween, the parallel ends, secured by the staples, provide at this point a very thick insulating portion which encloses the air space described.

In actual practice, it is found that an insulating batt as, for example, a batt composed of glass fibers, after being rolled and held in tightly compressed condition within a pipe section, when later removed from the pipe, tends to assume a position enveloping the pipe and to bring the parallel portions 15 together so that they may be readily stitched or stapled to unite them. The fibers, which are thus urged towards each other, tend to interknit and to form a substantially integral insulating wall about the pipe at such points of junction.

The new structure saves a great deal of time and expense both in packaging or shipment, and later in installation. For example, a workman may readily fold a one inch batt of glass fibers into the form illustrated in Fig. 1 and press this within a thin pipe, say, for example, a pipe having a diameter of three and one-half inches and the resulting pipe is buttressed from end to end by the resilient fibers which fill it. At the destination, a workman draws the batt 14 readily from the pipe and after the pipe is installed, draws the insulation about the pipe. With the parallel edge portions 15 urged towards each other, the workman staples such edges together in a minimum of time to complete the installation of the insulated pipe. If the free end portions 15 project in an undesired direction, the workman may grasp the handle 18 thus provided by such end portions and rotate the insulation tube to the desired angle.

When the pipe sections are assembled, there is a lap (usually about 1 inch) at the joined ends of the pipe, and since the insulation is approximately of the same length or only slightly shorter than the pipe, the insulation batts are compressed longitudinally thus making a tight joint where the abutting sections of insulation come together.

While I have shown the end portions of the batt secured together by staples, it will be understood that any suitable bonding or securing means may be employed.

While in the foregoing specification I have set forth a specific structure and method in considerable detail for the purpose of illustrating an embodiment of the invention, it will be understood that such details may be varied widely by those skilled in the art without departing from the spirit of my invention.

I claim:

1. An insulated pipe structure, comprising a thin walled pipe, a batt of resilient fibers preformed to be urged by their resiliency about said pipe, said batt having free end portions extending in parallel contiguous relation, and means securing said parallel portions together.

2. An insulating pipe structure comprising a pipe section, a batt of resilient glass fibers of substantially the same length as said section and enclosing said pipe, said batt having parallel abutting portions extending along one side of said pipe, and staples uniting said parallel batt portions.

3. In a method for shipping and installing pipe insulation, the steps of rolling a batt of resilient insulating fibers into a compressed roll of the same length as said pipe, introducing said roll in compressed condition within said pipe, withdrawing said roll and enclosing said pipe therewith while bringing the end portions of said batt into parallel contiguous relation, and uniting said parallel end portions of said batt.

4. In a method for shipping and installing pipe insulation, the steps of rolling a batt of resilient insulating fibers into a compressed roll of the same length as said pipe, introducing said roll in compressed condition within said pipe, whereby said batt is shaped to the contour of said pipe, withdrawing said roll and enclosing said pipe therewith while bringing the end portions of said batt into parallel contiguous relation, and stapling said parallel end portions of said batt.

5. In a method for shipping and installing pipe sections and insulation therefor, the steps of rolling a batt of insulating fibers into a compressed roll, introducing the same in compressed condition within a pipe section, whereby said batt is shaped to the contour of said pipe, withdrawing said roll from said pipe section and a similar roll from a pipe section which is to be joined to said first-mentioned pipe section, uniting said pipe sections by bringing their portions thereof into overlapping relation, enclosing said pipe sections with said batts of insulating fibers, compressing said batts longitudinally and toward their abutting ends to form a tight joint between said abutting ends, and securing the end portions of each batt in parallel contiguous relation about said pipe sections.

6. A pipe and insulation package, comprising a pipe having thin deformable walls, and a batt of resilient insulation therefor adapted to be drawn about said pipe and secured thereon, said insulation batt being of substantially the same length as said pipe and being tightly rolled upon itself in compressed condition and being pressed into said pipe so as to extend from end to end thereof in wall-engaging relation, whereby the resilient batt presses outwardly against the wall of said pipe to buttress the same and is itself thereby formed to the contour of said pipe with the result that when said batt is removed from said pipe and drawn thereabout it clings to the pipe.

7. A pipe and insulation package, comprising a pipe having thin deformable walls, and a batt of insulation material of substantially equal length with said pipe and consisting of resilient fibers, said batt having free end portions and being adapted to be drawn about said pipe and secured thereon with the free edges of said batt in abutting parallel relation, said batt being tightly rolled upon itself to compress said fibers and being pressed into said pipe so as to extend from end to end thereof in wall-engaging relation, whereby the resilient fibers of said batt press outwardly against the wall of said pipe to buttress the same and the batt is itself thereby formed to the contour of said pipe with the result that when said batt is removed from said pipe and drawn thereabout, it clings to the pipe.

JACK W. KICE.

REFERENCES CITED

The following references are of record in the file of this patent:

UNITED STATES PATENTS

| Number | Name | Date |
| --- | --- | --- |
| 699,322 | Hobbs | May 6, 1902 |
| 1,077,403 | Fricke | Nov. 4, 1913 |
| 1,430,690 | Schwab | Oct. 3, 1922 |
| 2,132,958 | Martin | Oct. 11, 1938 |
| 2,134,636 | Lewis et al. | Oct. 25, 1938 |
| 2,555,205 | Steffens | May 29, 1951 |